Sept. 24, 1963   M. F. LALOË ET AL   3,104,586
IMAGE INTERPOLATOR FOR MOTION PICTURE FILMS AND THE LIKE
Filed Sept. 12, 1961   4 Sheets-Sheet 1
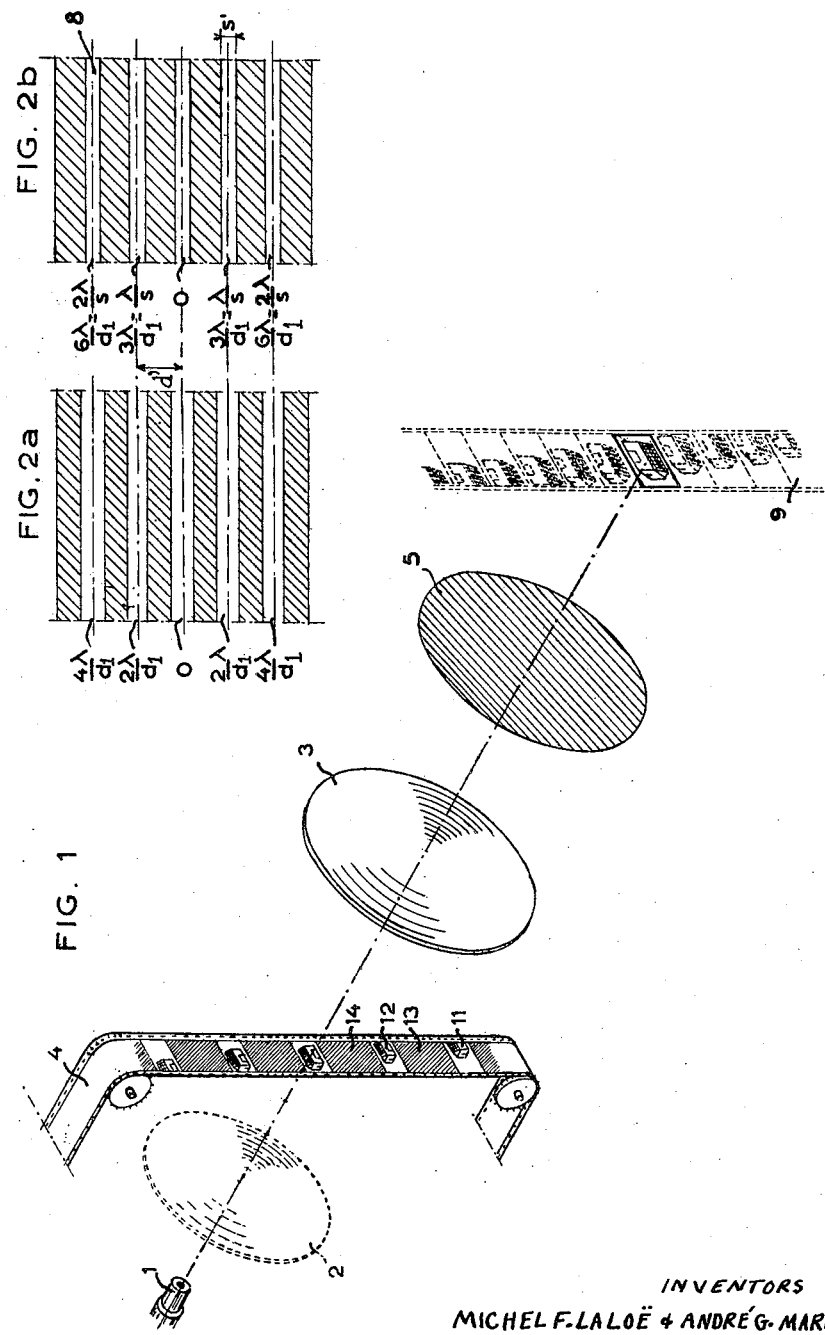
INVENTORS
MICHEL F. LALOË & ANDRÉ G. MARECHAL
BY
Abraham A. Saffitz
ATTORNEY Sept. 24, 1963   M. F. LALOË ET AL   3,104,586
IMAGE INTERPOLATOR FOR MOTION PICTURE FILMS AND THE LIKE
Filed Sept. 12, 1961   4 Sheets-Sheet 2
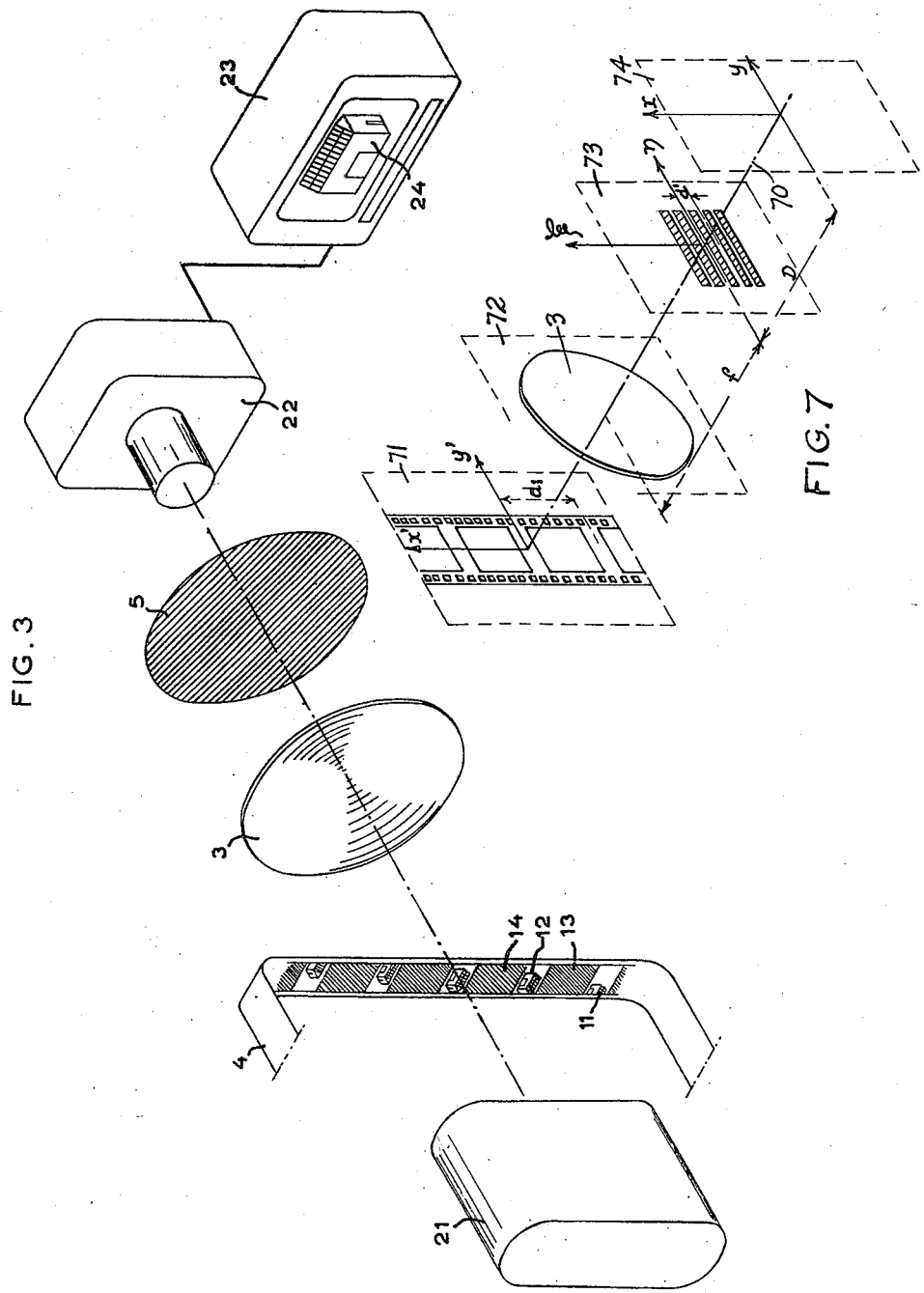
INVENTORS
MICHEL F. LALOË & ANDRÉ G. MARECHAL
BY
Abraham A. Saffitz
ATTORNEY Sept. 24, 1963    M. F. LALOË ET AL    3,104,586
IMAGE INTERPOLATOR FOR MOTION PICTURE FILMS AND THE LIKE
Filed Sept. 12, 1961    4 Sheets-Sheet 3

INVENTORS
MICHEL F. LALOË & ANDRÉ G. MARECHAL
BY
Abraham A. Saffitz
ATTORNEY

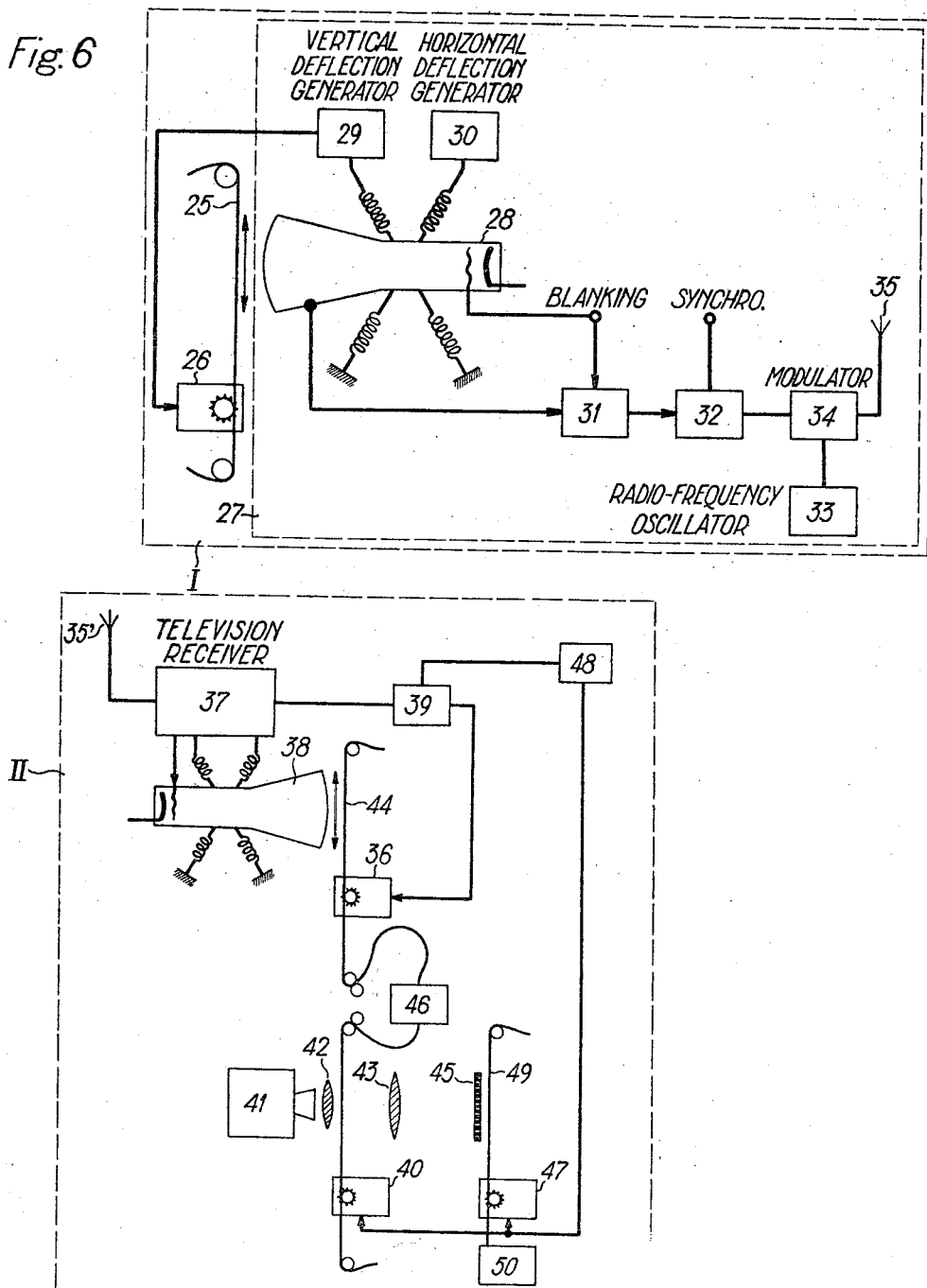

United States Patent Office 3,104,586
Patented Sept. 24, 1963

3,104,586
IMAGE INTERPOLATOR FOR MOTION PICTURE FILMS AND THE LIKE
Michel F. Laloë, Neuilly-sur-Seine, and André G. Maréchal, Paris, France, assignors to Charles Michelson, Paris, France
Filed Sept. 12, 1961, Ser. No. 137,593
Claims priority, application France Apr. 13, 1961
3 Claims. (Cl. 88—24)

The present invention relates to motion picture transmission systems such as television or motion picture film projection and, more particularly, to a device for increasing the number of images of an animated scene of which only a comparatively small number of pictures, separated from each other by regularly distributed black intervals, are available.

The successive frames or views of a motion picture film, which hereinafter will be called photograms, may be considered as time distributed samples of an animated scene to be reproduced or projected; if these known photograms are separated from each other by too long a time interval, moving picture projection becomes unacceptable at least when effected by conventional means.

The object of the invention is to provide interpolation means for reconstituting missing intermediate photograms in a film and more particularly for increasing the number of images which may be obtained from a given number of photograms in a film in order to make it convenient for conventional moving picture projection.

Broadly speaking, the system of the invention comprises a transparent support means such as a motion picture film bearing recurrent photograms of an animated scene at a respective distance or spatial period from each other measured along the motion direction of the film equal to an integer number $n$ times the length of one photogram, the successive photograms on said film being separated by opaque regions and thus forming together with said regions a grating-like object, optical means for projecting said grating-like object onto a further film or a screen through diffraction grating means, said grating means being designed for selectively transmitting only the spatial diffraction spectra from said object the order of which is zero or an integer multiple of $n$, whereby $(n-1)$ interpolated images are obtained on said further film or screen between any two consecutive images directly obtained from the original photograms.

The invention will be better understood by means of the following description and the accompanying drawings in which:

FIG. 1 shows an interpolator according to the invention operating with a coherent light source;

FIGS. 2a and 2b show gratings used in the embodiment of FIG. 1;

FIG. 3 shows an interpolator operating with an incoherent light source;

FIG. 6 represents in block diagram form a television transmission system making use of the motion picture film interpolator of the invention.

FIG. 7 is a schematic diagram for explaining the operation of the device of FIG. 1

Figure 4A:
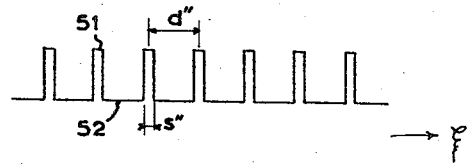
FIGS. 4a and 4b are explanatory diagrams relating to the operation of the embodiment of FIG. 3.

Referring to FIG. 1, 4 designates a film having successive frames or photograms 11, 12, . . . showing an animated scene. These frames may be considered as regularly time-spaced samples of said scene. Between the projections of these original photograms must be inserted interpolated photograms. The original frames are separated by dark spaces or areas 13, 14, . . . having a length equal to a whole number of frame lengths, for instance two in the case of FIG. 1. These dark areas constitute the unoccupied spaces to be furnished later (after projection of said film onto a further film or screen) with intermediate frames by interpolation. Film 4 constitutes a grating-like object consisting of frames of length $s$ separated by opaque regions of length $(d_1-s)$, the spatial period thus being equal to $d_1$.

One can say, as it were, that film 4 is a conventional film taken at the usual number of frames per second, which has been modified by blackening out two out of any three consecutive frames; the remaining views constitute the original, widely separated pictures, between which are to be reconstituted, by interpolation, the missing views.

Film 4 is illuminated by a small, coherent, monochromatic light source 1. An optical means, such as condenser 2, may be employed for illuminating the film but it does not play any essential part in the system of the invention. A number N of original photograms are illuminated at the same time.

The main optical means in the system is shown as lens 3 which forms an image 9 of film 4 (illuminated as described) at a plane conjugate to that of the film. This image would be a replica of the original film if certain arrangements were not made to ensure that it will be otherwise. This arrangement consists of placing, in the conjugate plane with respect to lens 3 to the plane perpendicular to the optical axis of 3 and containing source 1, a diffraction grating 5 having appropriate characteristics. This diffraction grating consists of alternate thin slits and opaque strips, extending in the latter said plane along straight lines and in a direction substantially perpendicular to the length of film 4, the widths of said slit and strips having values determined in a manner explained later on.

It is well known (see for example "Principles of Optics" by Max Born and Emil Wolf, Pergamon Press, 1959, pages 419–420 and FIG. 8.32) that the vibration amplitude at each point in a plane conjugate to that of a point source can be obtained by effecting a two-dimensional Fourier transform on the point function representing the luminance of the object.

Referring now to FIG. 7, if rectangular coordinate systems $(x', y')$ $(\xi, \eta)$ and $(x, y)$, all having their origin point on the optical axis 70 of the system (with $x'$, $\xi$ and $x$ axes parallel to the length of film 4) are defined in the object plane 71, in the plane 73 conjugate to that of the source, and in the image plane 74, respectively; and if $F(x', y')$ designates the luminance (or transparency) of the object at point $(x', y')$, it results from Fraunhofer's theory that the vibration amplitude U at point $(\xi, \eta)$ is given by:

(1)
$$U(\xi, \eta) = C_1 \iint F(x', y') \exp\left[-\frac{2\pi j}{\lambda}\left(\frac{\xi x'}{f} + \frac{\eta y'}{f}\right)\right] dx' dy'$$

when $C_1$ is a constant, $j$ the imaginary unit, $\lambda$ the wavelength of the incident light, and $f$ the distance between plane 73 and plane 72 of lens 3. The double integral extends over the whole area of the object or, if F is zero outside the object, it may be considered extending over the whole $(x', y')$ plane.

In a similar manner, the vibration amplitude V at point $(x, y)$ of the image plane 74 will be given by:

(2)
$$V(x, y) = C_2 \iint U(\xi, \eta) \exp\left[-\frac{2\pi j}{\lambda}\left(\frac{x\xi}{D} + \frac{y\eta}{D}\right)\right] d\xi d\eta$$

where $C_2$ is a constant and D the distance between planes 73 and 74; the double integral extends over the whole $(\xi, \eta)$ plane.

Substituting in Equation 2, the value of U derived from Equation 1 it is found that $V(x, y)$ is the product of $F'-x, -y)$ by a constant factor; i.e. the image is an exact replica of the object, except for its size and reversal.

Now, things are different if a diffraction grating or a mask such as 5 (FIGS. 1 and 7) is interposed in the path of light through the $(\xi, \eta)$ plane. The modification of $V(x, y)$ resulting therefrom will now be considered, disregarding the $y'$, $\eta$ and $y$ coordinates, since none of the elements of FIG. 1 will be assumed to have selective properties in the common direction to the latter coordinates.

The operation of the mask or grating in plane 73 is equivalent to multiplying function $U(\xi)$ by an operator $g(\xi)$, the nature and mode of operation of which will now be considered in the case of a periodic object function $F(x')$ having a period $d_1$ with respect to $x'$.

From Fraunhofer's diffraction theory and Formula 1, it results that the diffraction pattern caused by such an object is very similar in its general character to that which would be caused by a typical object consisting of a series of N very narrow bright lines parallel to the $y'$ direction and with a mutual spacing $d_1$ in the $x'$ direction.

For such an object, the vibration amplitude in plane 73 is given by:

$$(3) \quad U_1(\xi) = C_3 \frac{1 - \exp\left(-\frac{2\pi}{\lambda} j \frac{N d_1}{f}\right)}{1 - \exp\left(-\frac{2\pi}{\lambda} j \frac{d_1}{f}\right)}$$

$C_3$ being a constant. Equal amplitude maxima of U occur for values of $\xi$ substantially equal to those for which the coefficient of $(-2\pi j)$ in the denominator is an integer number $q$, i.e. as such positions that:

$$(4) \quad \xi_q = q\lambda f/d_1$$

and the spacing from each maximum to the next one is $\lambda f/d_1$. From Formula 4, it is visible that the latter quantity is inversely proportional to $d_1$. Thus a spectrum with a bright fringe spatial period equal to $nd_1$ would correspond to an object with spacing $d_1/n$ between its bright lines. It may also be seen that the exact location of the bright lines in the object does not change the positions of diffraction fringes in plane 73; i.e., it is possible to shift the bright lines in the $x'$ direction without altering the diffraction pattern; the shifting just introduces a phase factor which is the same at every point of plane 73.

This shows that suppressing, for instance $(n-1)$ consecutive maxima in the pattern out of any $n$ ones is tantamount to dividing the line spacing in the object by $n$, i.e. to apparently multiply by $n$ the number of bright lines in the object. Consequently, after recombination in the image plane of the waves propagating beyond plane 73, it is possible to obtain in the latter plane $n$ times as many images as would be obtained otherwise.

Practically, the required suppressing can easily be effected with the aid of a mask consisting of alternate slits and strips of suitable dimensions. If, for instance, it is desired that $n=3$, two diffraction fringes must be suppressed out of every three; i.e., the width $s'$ of one slit must be equal to $(\lambda f/d_1)$, and the slits must be separative by opaque strips of width $(2\lambda f/d_1)$. The spatial period of the grating thus being $d' = 3\lambda f/d_1$, the mask provides the operation $g(\xi)$ hereinabove referred to.

A numerical example will show the practical character of the proposal arrangement. Taking, for instance:

$$d_1 = 20 \text{ mm.}; \lambda = 0.6 \cdot 10^{-4} \text{ mm.}; f = 200 \text{ mm.}$$

it is found that:

$$\lambda f/d_1 = 6 \cdot 10^{-3} \text{ mm.}$$

Building a diffraction grating with six thousandths of a millimeter slits and a twice as wide slit separation is perfectly feasible and within the possibilities of modern manufacturing methods.

Figure 5:
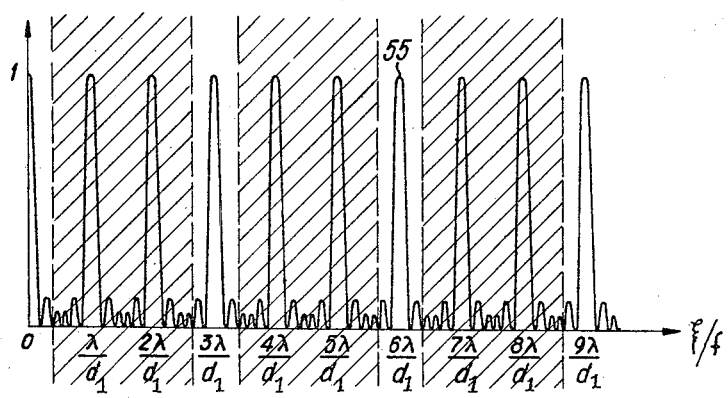
FIG. 5 represents the spatial spectrum of a grating-like object.

According to the invention, if an interpolation of ratio $n$ is desired, a mask is placed in the plane conjugate to that of the source for filtering out all the spatial spectra of the grating-like object except those which have orders multiple of $n$. This is shown in FIG. 5 where curve 55 represents the intensity of the diffraction pattern in said conjugate plane due to the grating-like object. The principal maxima of the spectra occur at the multiples of the fundamental angular separation $\lambda/d_1$ of the fringes, as seen from the center of lens 3 (FIGS. 1 and 7). If $d' = 3s' = 3\lambda f/d_1$, all the spectra except the spectra of orders 0, 3, 6, 9 ... are eliminated by opaque regions suitably located in the pupil plane and the spectra of orders 0, 3, 6, 9 are allowed to pass through transparent slits. Said opaque regions and slits are arranged in a diffraction grating. Consequently the general idea which governs the concept of the interpolator device is as follows: intercepting two spectral lines out of every three in the diffraction pattern, it should be possible to reestablish in the projected film views a triple periodicity, and thereby to obtain, by interpolation, the missing views suppressed by the blackening of certain portions of said film.

A more rigorous reasoning (see op. cit. pages 421 and 422) leads to the same conclusions, which still hold true if the number of views is not large; and practice confirms the value of interpolation when the views are not identical with each other, but show a general similarity with some changes in the details, such as found in the course of an animated moving picture scene.

In order to intercept two out of every three spectral lines when the original lines have a fundamental spatial angular separation $\lambda/d_1$, one can use a grating such as shown in FIG. 2b, having transparent slits 8 of a width $s'$ which is one-third of their spatial period $d'$. Certain considerations which will not be discussed in this specification show that such a grating constitutes the ideal filter in the present kind of device and that, even if the original views are completely discordant, it will not cause any crossviewing between them. The grating is here the equivalent of a low pass filter which, in electric signal transmission by pulse modulation, reconstitutes the original analog signal from a train or sequence of samples.

By way of example, if only one out of two views is missing on the original film, the grating can take the form shown in FIG. 2a, where the transparent and opaque portions have equal widths.

Grating 5, whichever kind it may be, is placed in a plane where an image of point source 1 would form if film 4 were not present. This point image, the location of which depends obviously upon the presence of condenser 2, will form in the case where the film would be an amplitude object of uniform illumination since the Fourier transform of unity is the Dirac function.

FIGS. 2a and 2b may lead to the fallacious conclusion that it is necessary exactly to center a transparent slit 8 on the zero order spectral fringe, whereas in fact, this is not imperative. In other words, if the period $d'$ of the grating has the right value relatively to the period $d_1$ of the film, the translation of the grating in its plane is not detrimental. It is also a well known result that the translation of the diffraction grating in its plane does not change the diffraction pattern.

One will note that the grating effecting the interpolation is a replica at a congruent scale of the mask which would have to be placed over an unmodified film in order to suppress a certain proportion of the views and thereby obtain the equivalent of original film 4. The grating-like object in the object plane and the grating in the conjugate plane to that of the source are, therefore, homothetic. But since there is no relation of image to object between them, they can, with impunity, be translated in their respective planes.

These conditions being fulfilled, the image received on film 9 of FIG. 1 is a substantial replica of the unmodified film from which film 4 derives.

FIG. 3 shows an interpolator comprising several elements of the embodiment of FIG. 1, such as a modified film 4 and a diffraction grating 5'. But the illumination, instead of coherent, is now assumed to be incoherent. The means for illuminating the frames of the modified film no longer is a point source of coherent illumination, but simply a non-point, monochromatic source, 21, a sodium vapor lamp for example.

In this case, the operation of the device can be explained as follows. The intensity distribution in the image can be expressed as a composition integral of the luminance function of the object and the square of the modulus of the Fourier transform of the transparency function of the diffraction grating. Since the Fourier transform of the square of the modulus of a function is the autocorrelation function of this function, a grating acts upon an incoherent beam as the autocorrelation function of its transparency.

Figure 4B:
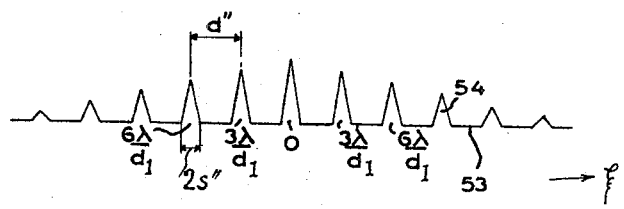

Therefore, if grating 5' used with incoherent light consists of transparent zones 51 separated by opaque regions 52 as represented in FIG. 4a where transparency is plotted in ordinate, the result will be the same as though one had disposed, with coherent light, a grating having the characteristics of FIG. 4b, with opaque regions 53 and zones 54 of which the transparency varies across a slit in accordance with a law shown in FIG. 4b where the abscissae correspond to coordinate $\xi$ and the ordinates represent intensity at each point as a function of $\xi$. The peak ordinate of each triangle itself varies, in accordance with a triangular function on either side of the zero order central triangle. The function represented by FIG. 4b is the autocorrelation function of that represented by FIG. 4a.

The position of the central sawtooth is invariable; it is centered on the zero order fringe. The zero order fringe, therefore, will always be transmitted, as well as those having orders which are multiples of a given number, and which can, for example, be 3, 6, 9 and so on, in the case where $d_1 = 3s$.

Since the sawteeth 54 of the function represented by FIG. 4b are twice as wide as slits 51 of FIG. 4a, it is appropriate to give the transparent zones of the grating operating in incoherent illumination a width approximately one-half that of the slits of a grating operating in coherent illumination. While in the case of the gratings of FIGS. 2a and 2b, $$\frac{s'}{d'} = \frac{s}{d_1}$$

in the case of the grating of FIG. 4a, $$\frac{s''}{d''} = \frac{s}{2d_1}$$

Referring now to FIG. 6, relating to a television system incorporating the invention, transmitted and interpolated photograms are received on a television camera tube 22 where they are scanned at conventional horizontal and vertical scanning frequencies, 30 images per second, 15,750 lines per second for example. The video signal is then applied to a conventional television set 23 where images 24 appear sequentially irrespectively of the fact that they are original ones or interpolated ones.

In FIG. 6, I is a transmitting station and II a receiving station separated from each other by such a distance that ultra-high-frequency line-of-sight conditions do not apply, transmission being only possible by tropospheric scatter propagation.

At station I, 25 designates a conventional film, 26 means for driving step by step said film and 27 a television transmitter. Said transmitter comprises a camera tube 28, a vertical deflection generator 29, a horizontal deflection generator 30, a blanking adder 31, a synchronization adder 32, a carrier oscillator 33, a modulator 34 and an antenna 35. The vertical deflection generator drives the driving means 26 and at each vertical synchronization pulse of generator 29, the film makes one step but the said step is equal to five times the length of a frame. It results therefrom that only a film frame out of five is scanned and transmitted. The frequency of the horizontal and vertical synchronization pulses is five times lower than usual, say respectively 3150 c./s. and 12 fields per second. The transmission channel width is 700 kilocycles/second instead of 3.5 megacycles/second and such a bandwidth can be transmitted over a high frequency carrier of say 10 mc./s.

At station II, the modulated carrier is received by antenna 35' and applied to television receiver 37 and cathode ray tube 38. The film 44 is located before the cathode ray tube and its advance is controlled by the vertical synchronization pulse circuit 39. Like in the case of transmission, the steps of the film are equal to five times the length of a frame on said film. The film 44 is developed in the developing chamber 46 and then passes through a device similar to that of FIG. 1 and comprising light source 41, condenser 42, objective 43 and grating 45. This device is housed in a casing not shown. Of course the film is left slack between the developing chamber and the interpolation device. A second film 49 is located in the plane conjugate to the plane of film 44 with respect to 43. Films 44 and 49 are driven by driving means 40 and 47 controlled by circuit 39 through multiplier circuit 48. Circuit 48 multiples the frequency of the vertical synchronization pulses five times. Finally film 49 is developed in chamber 50 and is then ready for being projected or televised.

What we claim is:

1. A device for producing interpolated image frames from original picture and opaque frames alternately and periodically arranged along a given direction on a substantially plane transparent support means and with a given spatial period and a given total-to-picture length ratio measured in said given direction, comprising, in combination, optical means including at least one objective lens and having an optical axis, means for securing said support means in a first plane perpendicular to said axis, an illuminating light source located in the vicinity of said axis and in a second plane substantially perpendicular thereto, said source illuminating a plurality of said picture frames, selective diffraction means located in a third plane conjugate to said second plane with respect to said optical means and having selective properties in a direction susbtantially parallel to said given direction, said source producing from said illuminated pictures a plurality of diffraction spectra of successively increasing order staggered in latter said direction and said diffraction means being so arranged as to filter out all of said spectra except that of zero order and those having orders equal to integer multiples of above-said given ratio, and means located in a fourth plane conjugate to said first plane with respect to said optical means for receiving images of said picture frames projected through said optical and diffraction means.

2. A device for producing interpolated image frames from original picture and opaque frames alternately and periodically arranged along a given direction on a substantially plane transparent support means and with a given spatial period and a given total-to-picture length ratio measured in said given direction, comprising, in combination, optical means including at least one objective lens and having an optical axis, means for securing said support means in a first plane perpendicular to said axis, an illuminating coherent light source located in the vicinity of said axis and in a second plane substantially perpendicular thereto, said source illuminating a plurality of said picture frames, selective diffraction means located in a third plane conjugate to said second plane with respect to said optical means and having selective properties in a direction substantially parallel to said given direction, said source producing from said illuminated pictures a plurality of diffraction spectra of successively increasing orders staggered in latter said direction and said diffraction means being so arranged as to filter out all of said spectra except that of zero order and those having orders equal to integer multiples of above-said given ratio, said diffraction means consisting of alternate transparent and opaque strips with their lengths extending in a direction substantially perpendicular to said given direction and having an opaque-to-transparent width ratio equal to above-said given ratio minus one, and means located in a fourth plane conjugate to said first plane with respect to said optical means for receiving images of said picture frames projected through said optical and diffraction means.

3. A device for producing interpolated image frames from original picture and opaque frames alternately and periodically arranged along a given direction on a substantially plane transparent support means and with a given spatial period and a given total-to-picture length ratio measured in said given direction, comprising, in combination, optical means including at least one objective lens and having an optical axis, means for securing said support means in a first plane perpendicular to said axis, an illuminating incoherent light source located in the vicinity of said axis and in a second plane substantially perpendicular thereto, said source illuminating a plurality of said picture frames, selective diffraction means located in a third plane conjugate to said second plane with respect to said optical means and having selective properties in a direction substantially parallel to said given direction, said source producing from said illuminated pictures a plurality of diffraction spectra of successively increasing orders staggered in latter said direction and said diffraction means being so arranged as to filter out all of said spectra except that of zero order and those having orders equal to integer multiples of above-said given ratio, said diffraction means consisting of alternate transparent and opaque strips with their lengths extending in a direction substantially perpendicular to said given direction and having a ratio of opaque strip width to transparent strip half-width equal to above-said given ratio minus one, and means located in a fourth plane conjugate to said first plane with respect to said optical means for receiving images of said picture frames projected through said optical and diffraction means.

References Cited in the file of this patent

UNITED STATES PATENTS

| | | |
|---|---|---|
| 817,569 | Ives | Apr. 10, 1906 |
| 1,807,877 | Sanford | June 2, 1931 |
| 1,951,038 | Pask | Mar. 13, 1934 |